(12) United States Patent
Freericks et al.

(10) Patent No.: US 8,341,649 B2
(45) Date of Patent: Dec. 25, 2012

(54) SYSTEM AND METHOD FOR HANDLING AN EVENT IN A COMPUTER SYSTEM

(75) Inventors: Helmuth Freericks, Palm Beach Gardens, FL (US); Oleg Kouznetsov, Tequesta, FL (US)

(73) Assignee: Wontok, Inc., Palm Beach Gardens, FL (US)

( * ) Notice: Subject to any disclaimer, the term of this patent is extended or adjusted under 35 U.S.C. 154(b) by 508 days.

(21) Appl. No.: 12/648,704

(22) Filed: Dec. 29, 2009

(65) Prior Publication Data

US 2010/0138843 A1    Jun. 3, 2010

Related U.S. Application Data

(63) Continuation-in-part of application No. 11/175,006, filed on Jul. 5, 2005, now Pat. No. 7,765,558.

(60) Provisional application No. 60/585,520, filed on Jul. 6, 2004.

(30) Foreign Application Priority Data

Jul. 8, 2004   (AU) ................................ 2004903759

(51) Int. Cl.
  *G06F 13/00*   (2006.01)
(52) U.S. Cl. ....................................................... 719/318
(58) Field of Classification Search ................... 719/318
  See application file for complete search history.

(56) References Cited

U.S. PATENT DOCUMENTS

| | | | |
|---|---|---|---|
| 5,148,544 A | | 9/1992 | Cutler et al. |
| 5,740,413 A | * | 4/1998 | Alpert et al. ................. 712/227 |
| 6,131,163 A | | 10/2000 | Wiegel |
| 6,205,492 B1 | | 3/2001 | Shaw et al. |
| 6,871,350 B2 | | 3/2005 | Wong et al. |
| 6,983,452 B1 | * | 1/2006 | Willems ........................ 717/128 |
| 7,000,100 B2 | | 2/2006 | Lacombe et al. |

(Continued)

FOREIGN PATENT DOCUMENTS

WO    WO 03058451    7/2003

(Continued)

OTHER PUBLICATIONS

Seo, J.T.: "Malicious code detection technology using environment", Journal on Korea Institutes of Information Security and Cryptology, Aug. 2007, vol. 17, No. 4, pp. 74-82.

(Continued)

*Primary Examiner* — Andy Ho

(74) *Attorney, Agent, or Firm* — Fox Rothschild, LLP; Robert J. Sacco

(57) ABSTRACT

Stack-based system for handling an event in a computer system which has a kernel mode and a user-mode, concurrently by one or more user-mode applications. The systems comprise at least one computing device. The computing device is configured to suspend an occurrence of the event in the kernel-mode of an operating system running thereon. The computing device is also configured to cause the event to occur in the user-mode of the operating system. The computing device is further configured to determine if an occurrence of the event in the kernel-mode will compromise the computer system by analyzing the occurrence of the event in the user-mode. If it is determined that the occurrence of the event in the kernel-mode will compromise the computer system, then the computing device executes at least one security measure.

25 Claims, 9 Drawing Sheets

U.S. PATENT DOCUMENTS

| | | |
|---|---|---|
| 7,007,157 B2 | 2/2006 | Morris et al. |
| 7,024,672 B2 | 4/2006 | Callender et al. |
| 7,085,928 B1 | 8/2006 | Schmid et al. |
| 7,107,497 B2 * | 9/2006 | McGuire et al. ............. 714/48 |
| 7,181,382 B2 | 2/2007 | Shier et al. |
| 7,363,657 B2 | 4/2008 | Caccavale |
| 7,398,389 B2 | 7/2008 | Teal et al. |
| 7,437,759 B1 | 10/2008 | Szor |
| 7,472,272 B2 | 12/2008 | Stamos et al. |
| 7,530,093 B2 | 5/2009 | Samuelsson et al. |
| 7,577,765 B2 | 8/2009 | Bhesania et al. |
| 7,702,906 B1 | 4/2010 | Karr et al. |
| 7,765,558 B2 | 7/2010 | Kouznetsov et al. |
| 2002/0152331 A1 | 10/2002 | Wong et al. |
| 2003/0081601 A1 | 5/2003 | Morris et al. |
| 2003/0101381 A1 | 5/2003 | Mateev et al. |
| 2003/0120935 A1 | 6/2003 | Teal et al. |
| 2003/0159070 A1 | 8/2003 | Mayer et al. |
| 2004/0003137 A1 | 1/2004 | Callender et al. |
| 2004/0098639 A1 * | 5/2004 | Liu ........................ 714/35 |
| 2004/0133801 A1 * | 7/2004 | Pastorelli et al. ............ 713/200 |
| 2004/0216145 A1 | 10/2004 | Wong et al. |
| 2004/0243783 A1 | 12/2004 | Ding et al. |
| 2005/0246522 A1 | 11/2005 | Samuelsson et al. |
| 2005/0246564 A1 | 11/2005 | Bhesania et al. |
| 2007/0101435 A1 | 5/2007 | Konanka et al. |
| 2008/0005794 A1 | 1/2008 | Inoue et al. |
| 2008/0016314 A1 | 1/2008 | Li et al. |
| 2008/0016339 A1 | 1/2008 | Shukla |
| 2008/0034429 A1 | 2/2008 | Schneider |
| 2008/0092145 A1 | 4/2008 | Sun et al. |
| 2008/0263658 A1 | 10/2008 | Michael et al. |
| 2009/0288167 A1 | 11/2009 | Freericks et al. |
| 2010/0138843 A1 | 6/2010 | Freericks et al. |
| 2010/0251368 A1 | 9/2010 | Kouznetsov et al. |

FOREIGN PATENT DOCUMENTS

| | | |
|---|---|---|
| WO | WO-03058451 A1 | 7/2003 |

OTHER PUBLICATIONS

International Preliminary Report on Patenability; Application Serial No. PCT/US2009/044505; filed May 19, 2009.

Information about Related Patents and Patent Applications, see section 6 of the accompanying Information Disclosure Statement Letter, which concerns Related Patents and Patent Applications.

* cited by examiner

SYSTEM AND METHOD FOR HANDLING AN EVENT IN A COMPUTER SYSTEM

CROSS REFERENCE TO RELATED APPLICATIONS

This application is a continuation-in-part of U.S. patent application Ser. No. 11/175,006, filed Jul. 5, 2005, now U.S. Pat. No. 7,765,558, which in turn claims priority from U.S. Provisional Application Ser. No. 60/585,520 filed Jul. 6, 2004, and Australian Patent Application Number 2004903759, filed Jul. 8, 2004, all of which are hereby incorporated by reference in their entireties.

FIELD OF THE INVENTION

One or more embodiments of the present invention relates generally to a system and method for handling an event in a computer system that has a kernel-mode and a user-mode, and has particular—but by no means exclusive—application to computer security.

BACKGROUND OF THE INVENTION

Today's computer systems commonly employ operating systems that allow a process (software module) to run in either a user-mode or a kernel-mode. Generally speaking, an operating system will not allow the process to perform certain actions when in the user-mode; for example, prevent access to a particular block of memory or prevent an attempt to modify certain data. However, when the process is in the kernel-mode the operating system generally does not place any restrictions on the actions performed by the process; for instance, the process can access a block of memory, which in the user-mode would not be possible.

Because a process operating in the kernel-mode on a computer system generally does not have any restrictions placed on its actions, it is of importance that a process operating in the kernel-mode is closely scrutinized to ensure that the integrity of the computer system is not compromised. There are numerous software packages on the market that scrutinize processes in the kernel-mode by analyzing their actions. However, these software packages have been designed to operate in the kernel-mode when analyzing the actions. Unfortunately, this not only makes the software packages relatively complex, but also has the potential to give rise to significant compatibility problems with other security software, and in some cases, standard software applications.

For example, traditional antivirus and other computer security programs/systems, which are based on standard specifications of the operating system, such as standard File System Filtering model (based on Installable File System I/O), have inherently limited abilities of monitoring and controlling activities of the underlying operating system. As result, traditional security software systems have a very limited and crude view of the operating system, and they are not capable of seeing a majority of extremely important activities which happen inside operating system in runtime. This lack of visibility causes traditional security software systems to miss a significant portion of the important activities. Furthermore, such traditional security software systems are limited in how many and what type of security measures they are capable of deploying. This is because the underlying operating system standard mechanisms (e.g., standard File System Filtering model) provide only a limited number of predefined control points at predefined locations, for use by security software to intercept, filter, monitor, and handle in order to deploy and enforce security measures.

Another drawback of standard operating system specifications such as standard File. System Filtering model is that the standard specifications are a contributing factor to numerous interoperability, incompatibility, performance degradation, and system instability problems that traditional security software products have been widely vulnerable to. These problems are especially evident when different security products from different security vendors are installed and running on the same computer at the same time. These problems arise because different kernel-mode software from one security vendor basically must contend with kernel-mode software from other security vendors for the same limited number of predefined control points at predefined locations within the underlying operating system.

Another drawback is that traditional antivirus and other computer security software have inherently limited abilities of enforcing any deployed security measures. This is because the locations and the communication protocols of the control points mentioned above are specified by standards of the underlying operating system. Technical details about the underlying operating system are well known and well documented through publicly available technical documentation. Authors of modern malware (e.g., hackers) are intimately familiar with the underlying operating system, and they study its technical documentation very closely. Therefore, they are in a good position of knowing what, where, which, and how computer security vendors deploying and enforcing their security measures inside the underlying operating system, in both in principle and in practice. Modern malware authors have benefited from a significant head-start and considerable flexibility in choosing the most effective methods and techniques of penetrating, blinding, bypassing, and subverting both the underlying operating system and computer security software.

SUMMARY OF THE INVENTION

According to a first aspect of the present invention, there is provided a system for handling an event in a computer system which has a kernel-mode and a user-mode, the system comprising at least one computing device configured to:

suspend an occurrence of the event in the kernel-mode of an operating system running on the computing device;

cause the event to occur in the user-mode for one or more clients of the operating system; and prioritize occurrence of the event among the one or more clients by use of a stack-based dispatcher.

Thus, by effecting the occurrence of the event in the user-mode, one or more embodiments of the present invention has the ability to reduce the complexity associated with analyzing the event in the kernel-mode. Furthermore, effecting the occurrence of the event in the user-mode has the potential to minimize compatibility problems between security software, and standard software applications.

Preferably, the user part is further operable to influence an operation of the computer system based on the occurrence of the event in the user-mode.

Thus, the ability to influence the operation of the computer system is advantageous because it can be used to overt an action which has the potential to compromise the integrity of the computer system.

Preferably, the user part is operable to influence the operation of the computer system by preventing the event from occurring in the kernel-mode.

Alternatively, the user part is operable to influence an occurrence of the event in the kernel-mode.

Preferably, the user part is operable to issue a request for the suspension, whilst the kernel part is operable to use the request in order to activate a provider part which is operable to effect suspension of a class of events that comprises the event.

Thus, providing the user part with the ability to initiate the suspension of the event when required.

Preferably, the provider part is operable to interact with an operating system of the computer system in order to effect the suspension.

Preferably, the kernel part is operable to issue an indication that the suspension has been effected, whilst the user part is operable to use the indication in effecting the occurrence of the event in the user-mode.

Preferably, the kernel part is operable to use an interprocess communication mechanism to transfer the indication to the user part, the user part being operable to use the interprocess communication mechanism to transfer the indication to the kernel part.

Thus, the interprocess communication mechanism allows the kernel part and the user part to be distinct processes on the computer system.

Preferably, the interprocess communication mechanism uses an Internet protocol.

Thus, using the Internet protocol provides the advantage of allowing the kernel part and the user part to be located on different computers.

Preferably, the kernel part and the user part are operable to respectively format the indication and the request according to a predefined format.

Preferably, the predefined format accords with a common information model defined by a distributed management task force.

Alternatively, the predefined format accords with another format defined by an application program interface.

Preferably, the kernel part operates in the kernel mode, whilst the user part operates in the user-mode.

Preferably, the user part comprises an anti-virus scan engine.

According to a second aspect of the present invention, there is provided a method of handling an event in a computer system which has a kernel-mode and a user-mode, the method comprising the following steps performed by at least one computing device:

suspending an occurrence of the event in the kernel-mode of an operating system running on the computing device;

causing the event to occur in the user-mode for one or more clients of the operating system; and prioritizing occurrence of the event among the one or more clients by use of a stack-based dispatcher.

Preferably, the method further comprises the further step of influencing an operation of the computer system based on the occurrence of the event in the user-mode.

Preferably, the step of influencing the operation of the computer system further comprises preventing the event from occurring in the kernel-mode.

Alternatively, the step of influencing the operation of the computer system further comprises influencing an occurrence of the event in the kernel-mode.

Preferably, the method further comprises the steps of:
issuing a request for the suspension; and
using the request in order to activate a provider part that is operable to effect suspension of a class of events that comprises the event.

Preferably, the method further comprises the step of using the provider to interact with an operating system of the computer system in order to effect the suspension.

Preferably, the method further comprises the steps of:
issuing an indication that the suspension has been effected; and
using the indication in effecting the occurrence of the event in the user-mode.

Preferably, the method further comprises the step of effecting a transfer of the indication to a user part for use thereby.

Preferably, the step of effecting a transfer of the indication comprises using an interprocess communication mechanism.

Preferably, the interprocess communication mechanism uses an Internet protocol.

Preferably, the method further comprises the step of formatting the indication and the request according to a predefined format.

Preferably, the predefined format accords with a common information model defined by a distributed management task force.

Alternatively, the predefined format accords with another format defined by an application program interface.

According to a third aspect of the present invention, there is provided software, which when executed on a computer, allows the computer to carry out the method according to the second aspect of the present invention.

According to a fourth aspect of the present invention, there is provided a computer readable medium comprising the software according to the third aspect of the present invention.

BRIEF DESCRIPTION OF THE DRAWINGS

Notwithstanding any other embodiments that may fall within the scope of the present invention, an embodiment of the present invention will now be described, by way of example only, with reference to the accompanying figures, in which.

DETAILED DESCRIPTION

Technology allows for the interception and handling of an arbitrarily large number of any system functions and any other arbitrary kernel-mode code in a unified, highly robust, and performance optimized fashion, limited by available system resources. This offers not only a fine-grain runtime control, but also an extremely effective, interoperable, and non-intrusive mechanism of controlling in runtime the underlying operating system.

One or more embodiments of the invention provides control of an underlying operating system when needed, where needed and how its needed, in order to provide improved control for designers and developers of security systems. This allows designers and developers of security systems to avoid being bound to impractical limits of standard specifications of the underlying operating system when making their design and implementation decision, in order to deliver comprehensive and effective security solutions.

One or more embodiments of the invention allows multiple different clients to control an arbitrarily large amount of any arbitrary kernel-mode code of the underlying operating system with fewer interoperability problems, limited by available system resources.

One or more embodiments of the invention prevents malware authors from knowing ahead of time the types, locations, and number of control points within the underlying operating system that is being controlled by one or more software security systems.

Figure 1:
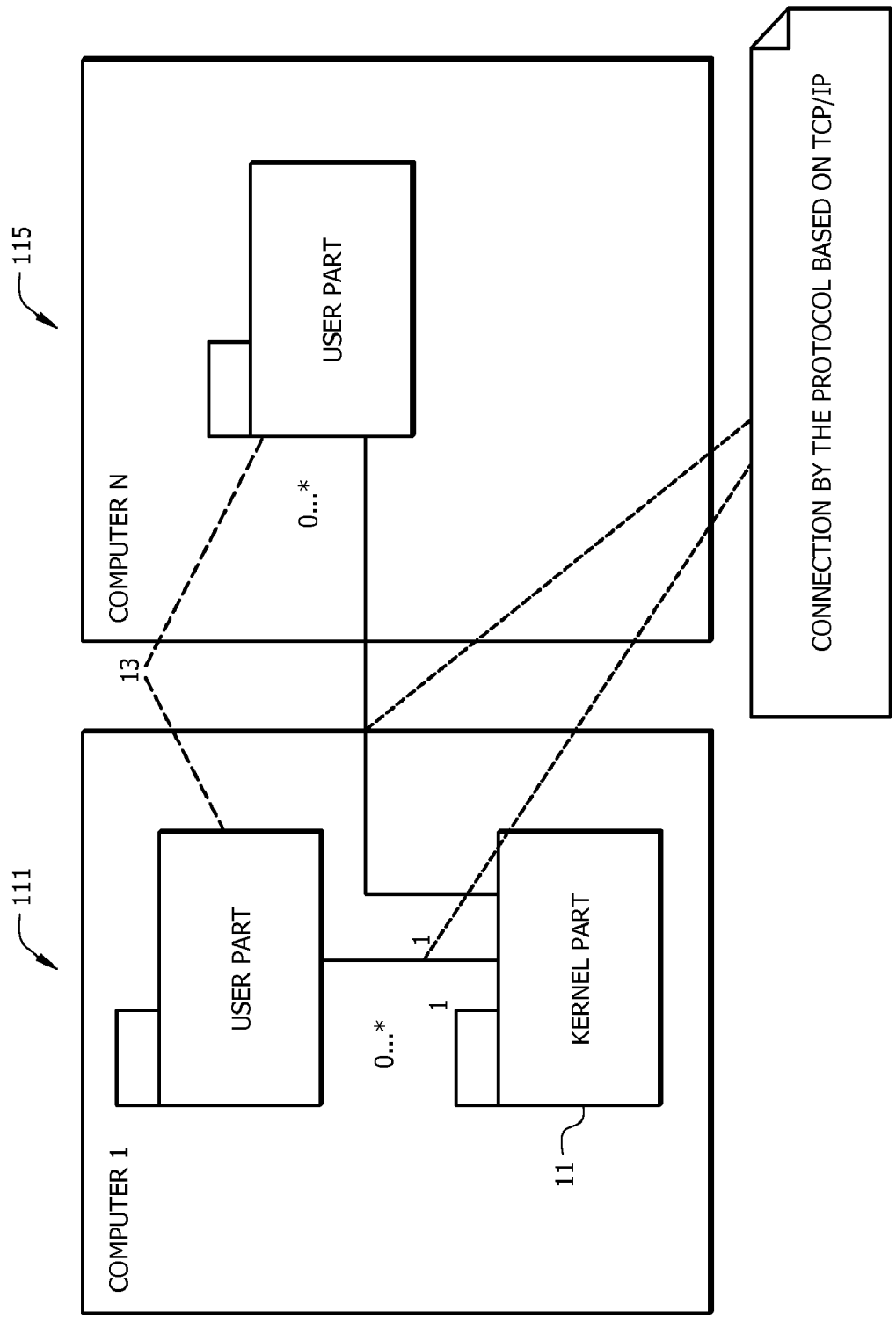
FIG. 1 provides a schematic diagram of an embodiment of the present invention, which comprises a user part and a kernel part.

As can be seen in FIG. 1, an embodiment of the present invention comprises a kernel part 11 and a user part 13. The kernel part 11 performs kernel-mode processes according to instructions or steps stored as kernel-mode code. The user part 13 performs user-mode processes (e.g., clients) according to instructions or steps stored as user-mode code.

One or more embodiments of the invention provides the control in a manner that is asynchronous with any user interaction, asynchronous among a plurality of clients running under the operating system, and asynchronous with other activities within the kernel. The control reacts continuously to unpredictable events that are initiated by predetermined intercepted functions (i.e., interceptions), the intercepted functions being callable by the operating system at any time with no dependence on user commands to invoke (i.e., asynchronously with user interaction). One or more embodiments of the invention is suitable for monitoring an overall behavior of the operating system, including behavior of loadable kernel-mode modules in run-time.

Because one or more embodiments of the invention do not rely on exceptions (i.e., interrupts), they do not interfere with scheduling and dispatching of processes by the operating system. Therefore, the one or more embodiments of the invention are compatible with continuous execution of multiple threads by the processor, concurrently, including threads that have been intercepted by the one or more embodiments of the invention.

One or more embodiments of the invention produces minimal performance degradation impact on a computer during dispatch and transfer control from an intercepted function to a hooking routine and back, by making this process run quickly. Quick processing is important so that security measures do not unacceptably slow down a computer, and in order to improve human user satisfaction.

One or more embodiments of the invention can manage interceptions in any allowable operating system context.

In any operating system, the kernel-mode processes have a higher privilege level than the user-mode processes. In order for user-mode processes to perform specialized functions, the user-mode processes must perform a system call into kernel-mode processes where kernel-mode code in the operating system will perform the needed task. For example, Linux and Windows are two operating systems that use kernel/user-mode architecture, where kernel-mode code executes at the CPU Ring 0 protection ring and user-mode executes at Ring 3 protection ring, in terms of x86 compatible CPU architecture. Competing requests from user-mode processes may be, mediated by a dispatcher, described in greater detail below.

Figure 2:
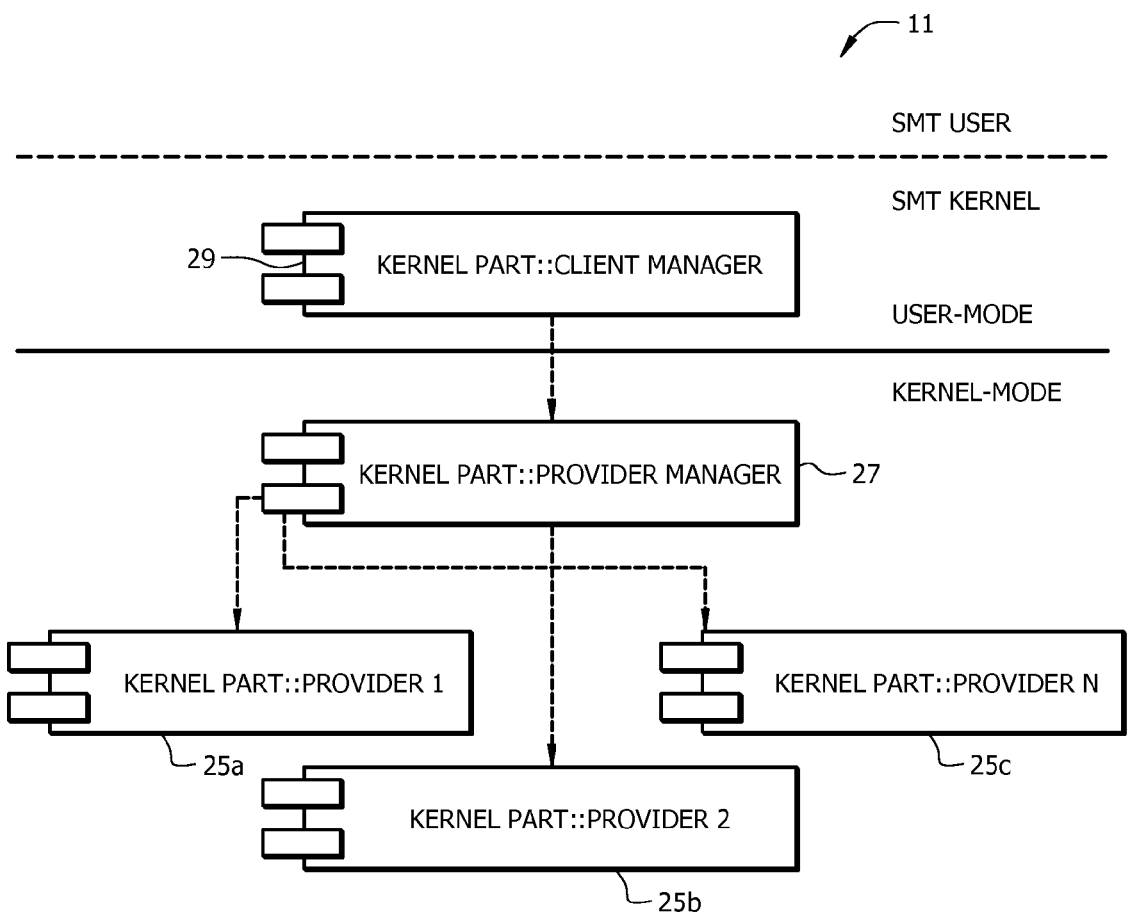
FIG. 2 provides a schematic diagram of the various parts that make-up the kernel part illustrated in FIG. 1.

With reference to FIG. 2, the kernel part 11 comprises three main components: one or more providers 25a, 25b, 25c; a provider manager 27; and a client manager 29. The providers 25a, 25b, 25c and the provider manager 27 are each in the form of a software module (a kernel-mode device driver) that is designed to operate in a kernel-mode of a Windows NT operating system that is being run on a first computer 111 (see FIG. 1). The client manager 29 is also in the form of a software module, but is designed to operate in a user-mode of the Windows NT operating system that is operating on the first computer 111. In the present embodiment of the invention the providers 25a; 25b, 25c, the provider manager 27 and the client manager 29 are developed using C/C++. However, as persons skilled in the art will readily appreciate the providers 25a, 25b, 25c, the provider manager 27 and the client manager 29 could be developed using other languages.

Persons skilled in the art will readily appreciate the differences between the kernel-mode and the user-mode of Windows NT operating system. However, those not skilled in the art are referred to the section of this document entitled "Background of the Invention" for a very brief overview of the basic difference between the kernel-mode and the user-mode.

Figure 3:
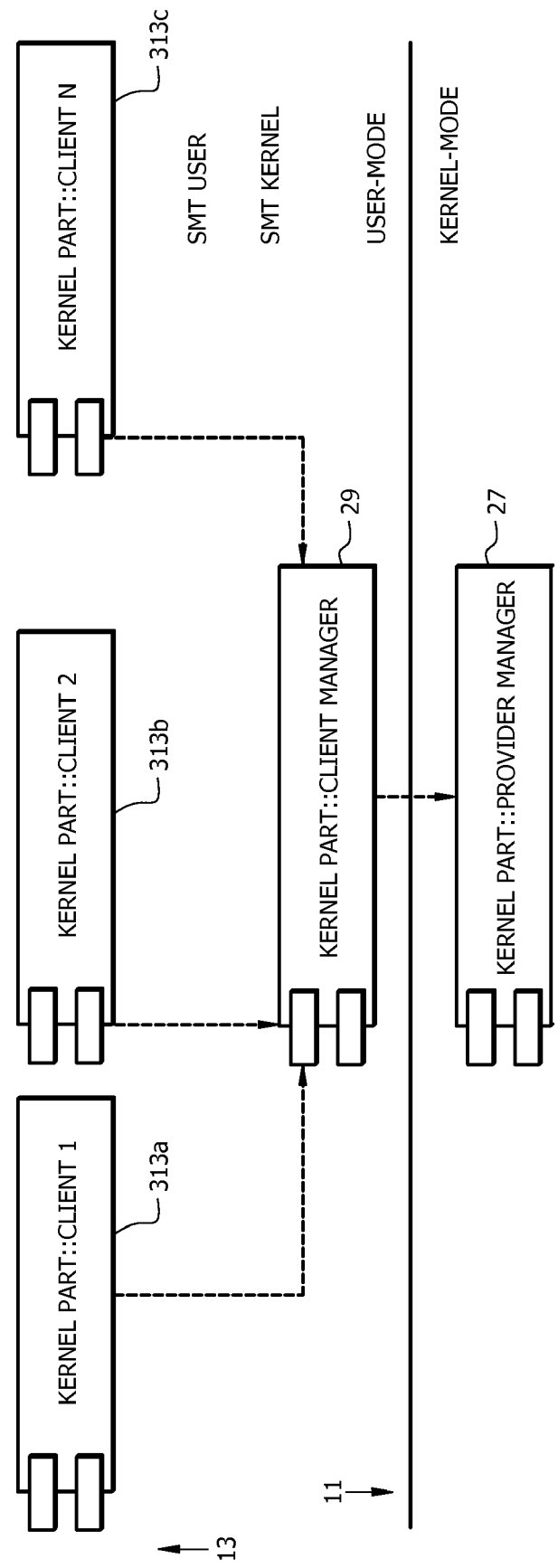
FIG. 3 provides a schematic diagram of the various parts that make-up the user part illustrated in FIG. 1.

As mentioned previously, an embodiment of the present invention also comprises a user part 13, which can be seen in FIG. 1. With reference to FIG. 3, the user part 13 comprises one or more software applications 313a, 313b, 313c. In the present embodiment, the applications 313a, 313b, 313c are developed using C/C++; however it is possible to use other languages. As shown in FIG. 1, the user part 13 can be installed on the first computer 111 and/or a second computer 115, which is also controlled by a Windows NT operating system. The software applications 313a, 313b, 313c are designed to operate in the user-mode of the Windows NT operating system operating on the first and second computers 111 and 115. As is discussed in more detail shortly, each of the software applications 313a, 313b, 313c can be a computer anti-virus scan engine that is designed to analyze events scheduled to occur in the kernel-mode of the Windows NT operating system running on the first computer 111, and to execute anti-viral measures on the first computer 111, such as denying file I/O if the analysis of the events indicates that the events may compromise the first computer 111.

Figure 4:
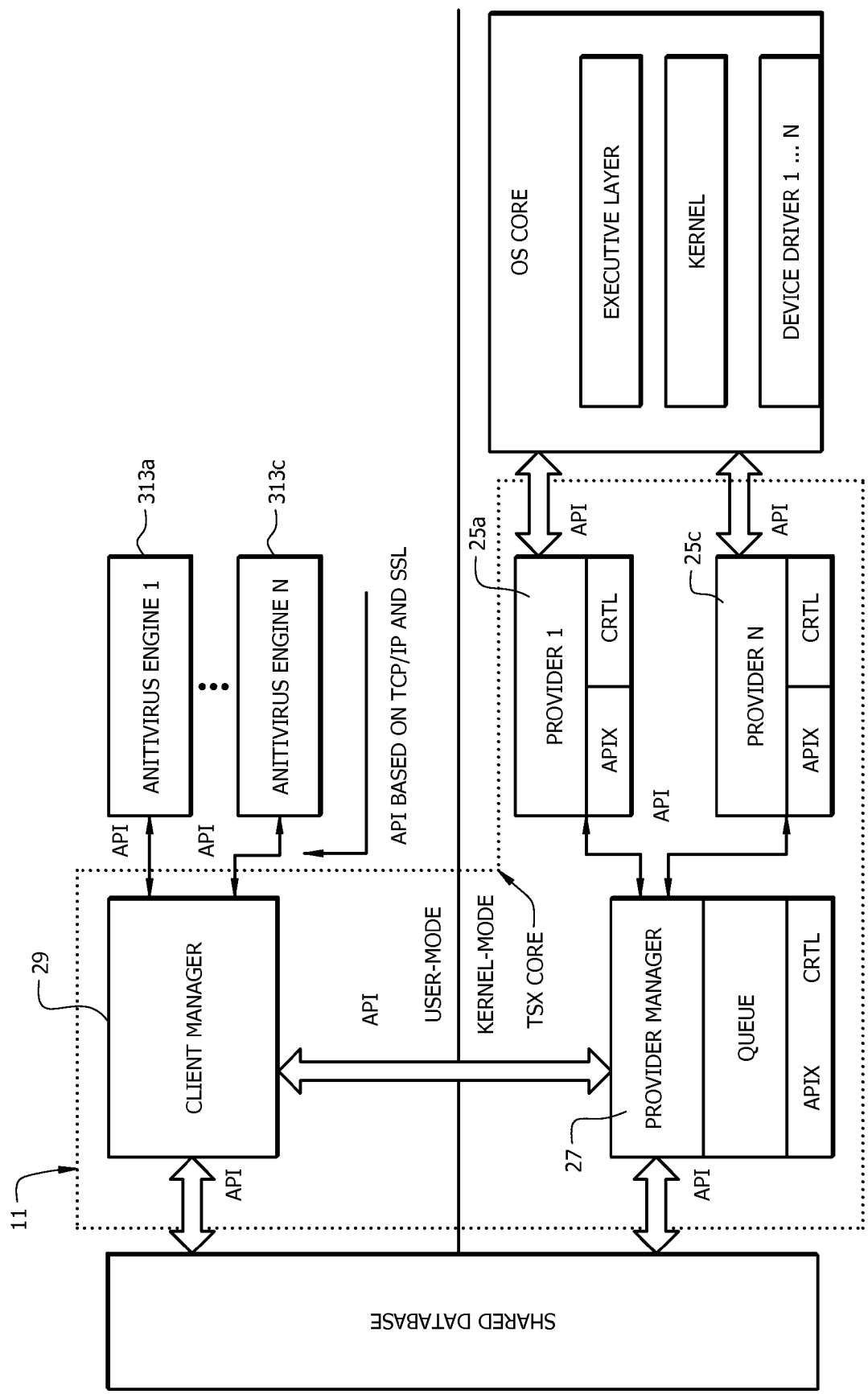
FIG. 4 provides a schematic diagram of the various parts that make-up the user part and kernel part illustrated in FIG. 1.

With reference to the FIG. 4, the software applications 313a, 313b (not shown in FIG. 4), 313c and the kernel part 11 encoded by the dotted line are designed to interact with each other so that the software applications 313a, 313b (not shown in FIG. 4), 313c can analyze the events scheduled to occur in the kernel-mode to the Windows NT operating system running on the first computer 111 (shown in FIG. 1), and to allow the software applications 313a, 313b (not shown in FIG. 4), 313c to initiate anti-viral measures on the first computer 111.

To enable the software applications 313a, 313b (not shown in FIG. 4), 313c and the kernel part 11 to interact with each other, the software applications 313a, 313b (not shown in FIG. 4), 313c and the client manager 29 (which forms part of the kernel part 11) are capable of establishing and maintaining an interprocess communication (IPC) mechanism between each other. More particularly, the IPC mechanism is such that it is supported by operating system protocols such as Internet (TCP/IP), Remote Procedure Call (RPC), Local Procedure Call (LPC), or other calling methods suitable for providing IPC, such as Dynamic Link Library (DLL) calls, etc. An advantage of using the interprocess communication mechanism that is supported by the Internet protocol suite is that it enables the user part 13 to be installed on either the first computer 111 or the second computer 115 and interact with the kernel part 11.

Each of software applications 313a, 313b (not shown in FIG. 4), 313c may interact independently with kernel part 11 at run time. In order to eliminate contention among competing software applications, a "Dispatcher" provides a process to allow runtime intercepting and handling in a unified fashion of an arbitrarily large number of processes that run at kernel-mode level, the processes being implemented for instance as 32-bit or 64-bit computer language instructions (i.e., "code") stored in a memory, for execution in one or more processors coupled to the memory. The number of processes that run at kernel-mode level is limited by the available quantity of virtual memory or other system resources, the virtual memory and system resources being needed to support the processes.

Any valid arbitrary kernel-mode address that corresponds to any valid arbitrary kernel-mode executable code will be referred to herein as an "interception" or as an "interception target." For instance, the interception may correspond to the address of the entry to a service routine, or alternatively the interception may correspond to an address anywhere within of an operating system routine. A "hooking routine" will be referred to herein as additional processes (implemented by computer language code) that are provided by one or more of software applications 313a, 313b (not shown in FIG. 4), 313c. The hooking routines are designed to execute before, or in place of, the service routine referred to by the interception. Once a hooking routine is configured to execute before or in place of a service routine, the hooking routine and the interception are said to be registered with each other. The Dispatcher ensures that each individual interception can be registered with a large number of different hooking routines that could execute simultaneously and concurrently, limited by the quantity of available virtual memory. Therefore, a large number of different hooking routines could be assigned to a single interception. Because an interception may be intercepted by multiple clients at the same time and handled by multiple handling routines concurrently, it is important to ensure that multiple clients can execute concurrently without interoperability problems while their handling routines handle the interception.

Software applications 313a, 313b (not shown in FIG. 4) and 313c, based on their algorithmic needs and execution logic, which in turn are based on their purpose and functionality, instruct the Dispatcher which interceptions they would like to establish in runtime by providing the Dispatcher with the kernel-mode address(es) that correspond to the interception(s). Such interceptions are called runtime interceptions.

When the software applications 313a, 313b (not shown in FIG. 4), 313c wish to analyze the events that are scheduled to occur in the kernel-mode of the Windows NT operating system on the first computer 111, the software applications 313a, 313b (not shown in FIG. 4), 313c first take the necessary steps to establish the interprocess communication mechanism— which as mentioned previously provides a communication link between the software applications 313a, 313b (not shown in FIG. 4), 313c and the client manager 29. Persons skilled in the art will readily appreciate the mechanisms involved in establishing the interprocess communication mechanism. However, persons not skilled in the art are referred to any of the large selection of Windows NT system programming textbooks that are available.

Scheduling of the interprocess communications that wish to analyze the events is facilitated by use of the Dispatcher. The Dispatcher allows for multiple different hooking routines to handle the same single interception without interoperability conflicts. The Dispatcher maintains a comprehensive multi-tiered hierarchy of individual interceptions, which may be registered with a large number of hooking routines. The hooking routines may be registered with a large number of clients. Multiple hooking routines could have different algorithms and execution logic, but they still do not interfere with each other during execution while handling the same interception. A data structure termed "context" is used to provide a coherent mechanism for tracking related state-information of multiple clients and passing data (e.g., parameters) to and from the various multiple hooking routines and interception targets. Together, this results in the ability to design and implement various highly comprehensive and truly scalable user mode or kernel mode programs, which demand fine-grained and multi-layered control over underlying operating system code.

The Dispatcher also enables extremely fine-granularity of interceptions, which allows multiple different clients intercepting an arbitrary fragment of the kernel-mode code using only one parameter for interception. The parameter used for interception is the starting address of the original binary executable code of the interception target. The starting address, for example, could be an entry point to a system function at the beginning of the function. The starting address may also point to code deep inside system function or point to any arbitrary kernel-mode code. Clients calculate starting address of the original binary executable code of the interception target based on their actual algorithmic needs and goals absolutely independently from the Dispatcher. For example, clients acting as signature-based antimalware scanners (e.g., Antivirus, Antispyware, etc.) for Windows NT platforms might need to handle file I/O operating system requests by intercepting code that is: inside each individual Files System Driver routine or handling File I/O operating system request; inside standard I/O Manager routines (Installable File System facility) or handling File I/O operating system; inside System Service Dispatch Table routines (SSDT facility) or handling File I/O operating system requests; or inside standard Filter Manager routines (File System Mini-Filter facility). For these exemplary interceptions, because the intercepted code is distinctly different, the calculated starting address of these exemplary interceptions may be different and the File I/O operating system requests may be intercepted on different logical levels.

The Dispatcher uses a highly effective and comprehensive synchronization, in order to provide that on multi-CPU core systems all available operating system physical CPU cores will be fully utilized. Thus, multiple different clients with multiple different hooking routines could handle the same interception while executing on all available physical CPU cores simultaneously and concurrently, according to the logic of standard scheduler and dispatcher of the operating system. Thus, having more physical CPU cores present provides better utilization, which results in faster execution of different hooking routines due to concurrent execution.

Runtime interceptions are implemented by inserting special op-codes into original binary executable code of the interception target. The special op-codes are inserted by the Universal Interception Manager (UIM), within the Dispatcher, based on one or more interception requests from the client. The client calculates and provides starting address of the interception to the UIM, based on the client's algorithmic needs as described earlier. The special op-code ensures that execution of the intercepted code will result in transferring control from the interception target to the Dispatcher. This is to provide reliable control transfer from the intercepted code to the Dispatcher without any need for the Dispatcher to keep track of multiple different data tables that operating system may keep in different memory locations for pointing to the address of the same executable code of the interception target.

The Dispatcher utilizes a dynamic disassembler to properly parse and calculate the length of the op-codes of the original binary executable code of the interception target. The Dispatcher relocates a fragment of the original binary executable code of the interception target according to its actual length calculated by the dynamic disassembler. As result of relocation, the Dispatcher properly recalculates all relevant offsets of such relocated code on as needed basis, based on the actual type, length, and sequence of the original op-codes of the original binary executable code of the interception target, as applicable.

Figure 7:
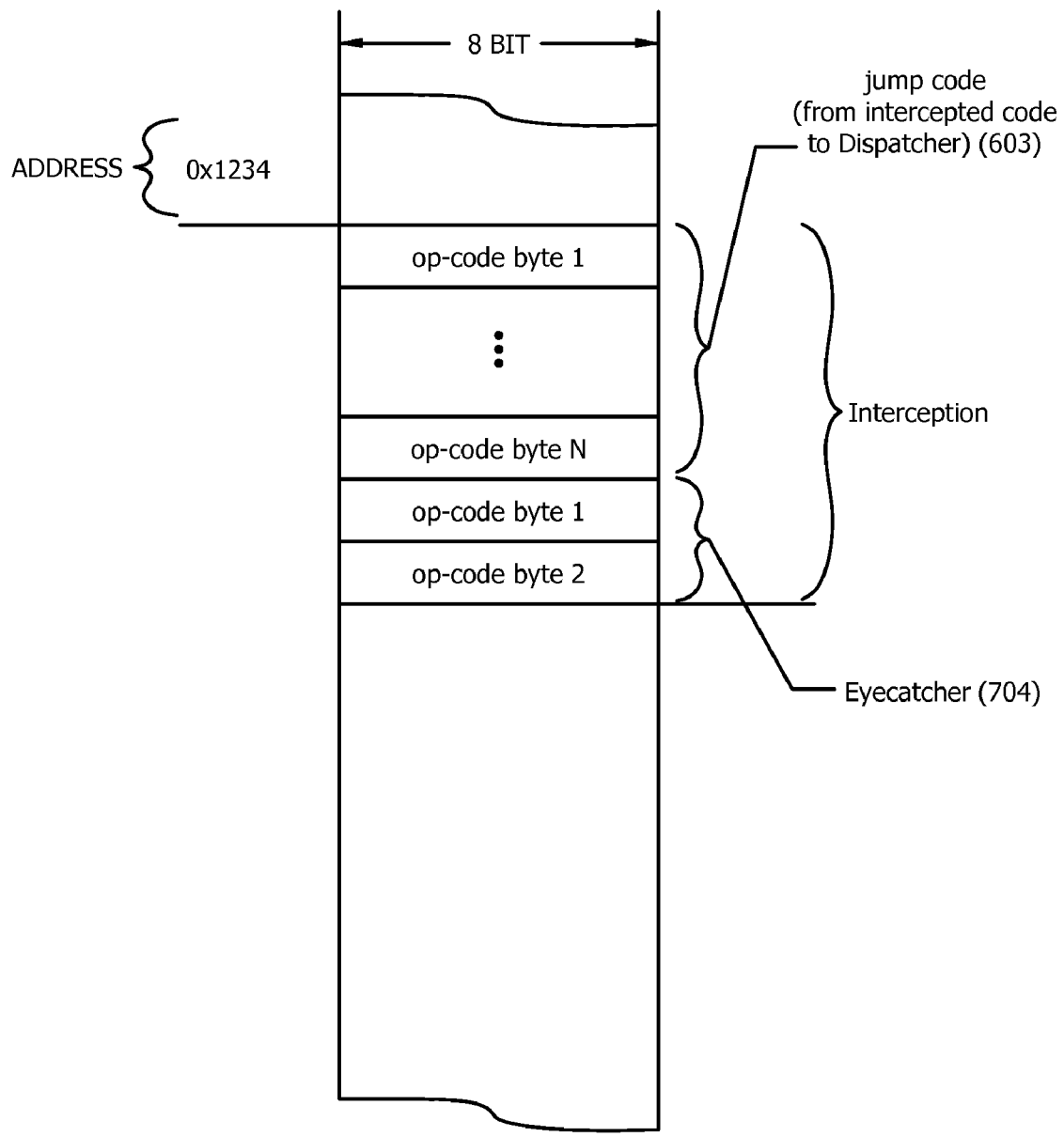
FIG. 7 provides an exemplary illustration of memory patching according to an embodiment of the present invention.

Since at any moment of time some other kernel-mode code unknown to the Dispatcher could patch the same kernel-mode addresses as the interception targets established by the Dispatcher, the Dispatcher should unmistakably and reliably identify source of the interception target, i.e., the Dispatcher needs to identify which interception caused transfer of control from the intercepted function to the Dispatcher. In order for the Dispatcher to properly handle all subsequent calls originated from the interception target established by the Dispatcher, the Dispatcher performs the following steps: first, the Dispatcher stores address where original binary executable code of the interception target was located; and, second, the Dispatcher places two-bytes special "eyecatcher" op-codes immediately after the original patched executable code of the interception target. The eyecatcher op-codes act as a digital fingerprint to identify the source of the interception. FIG. 7 described below illustrates the eyecatcher op-codes.

Thus the Dispatcher is able to reliably and unmistakably identify source of the interception along with all subsequent calls originated from the interception target, given knowledge of the address of interception target and the special "eyecatcher" op-codes. Interoperability is maintained with other kernel-mode code unknown to the Dispatcher in order to patch the same kernel-mode addresses as the interception targets established by the Dispatcher.

After an interception is triggered, control is automatically transferred to the Dispatcher. The Dispatcher validates the interception that caused control to transfer from the intercepted function to the Dispatcher, in order to ensure that the interception is a registered interception and not an unknown kernel-mode code and not an unexpected source in general. The Dispatcher validates the source of the call by checking previously saved address of the interception target (i.e., the location) and checking the eyecatcher op-codes (i.e., the fingerprint) embedded into interception target. Then the Dispatcher examines its internal list of all registered clients and all respective hooking routines registered with clients. The Dispatcher then passes control to hooking routines that have been assigned to and associated with the triggered interception. Based on the internal algorithmic needs and execution logic of each individual hooking routine the Dispatcher provides each hooking routine of each client with a choice of how to handle an interception. Exemplary choices for handling an interception may include:

(1) Analyzing input parameters of the interception, and calling other system functions before executing the original code of the interception;

(2) Allowing execution of the original code of the interception, with either changed or unchanged input parameters;

(3) Allowing return from the original code of the interception with either changed or unchanged output parameters;

(4) Analyzing the output parameters of the interception, and subsequent calling other system functions after executing the original code of the interception;

(5) Blocking or ignoring execution of the original code of the interception, and returning output parameters and return code as needed; or (6) Emulating execution of the original code of the interception, without in fact calling the interception, and returning output parameters and return code as needed.

The Dispatcher provides a comprehensive stack-based model of dispatching calls (i.e., transferring control) from individual interceptions of multiple hooking routines, and then returning control back to the calling client. The Dispatcher allows execution of multiple hooking routines that could be associated with an individual interception without any interference or interoperability problems arising from other clients. Such a stack-based model of dispatching ensures a high degree of reliability and transparency. Multiple hooking routines could have different algorithms and execution logic, without interfering with each other while handling calls to the same intercepted function. Reliability and transparency are important when multiple hooking routines handle the same interception simultaneously, in particular when the multiple hooking routines have multiple algorithmic needs and execution logic. The order in which multiple hooking routines are called is determined by their location on the Dispatcher stack. Such locations within the stack also determine the priority of multiple hooking routines. Items toward the top of a stack have higher priority.

The Dispatcher invokes the original binary executable code of the interception target after calling all hooking routines associated with the interception. Because the original binary executable code of the interception target is called last, it has the lowest priority. The Dispatcher also ensures that all hooking routines associated with the interception perform Pre-processing, on a basis of algorithmic need and execution logic, examples of which were described earlier with respect to client calculation of starting addresses. Pre-processing includes hooking routines that are called before control is transferred to the intercepted function, thus allowing parameters of the call to be analyzed and optionally altered by the hooking routines before passing control to the intercepted function.

After control is returned from the original binary executable code of the interception target back to the Dispatcher, the Dispatcher walks the stack backwards from the lowest to the highest priority. It also ensures that all hooking routines associated with the interception could perform Post-processing, on a basis of algorithmic need and execution logic, examples of which were described earlier with respect to client calculation of starting addresses. Post-processing includes hooking routines that are called after an intercepted function completes its execution, thus allowing parameters of the call to be analyzed and optionally altered by hooking routines immediately after the intercepted function completes its execution. The Dispatcher then transfers control back to the address that immediately follows the address from which the interception was called.

Having Pre-processing and Post-processing is useful for any comprehensive security measures that embodiments of the present invention are suitable to support.

Figure 5:
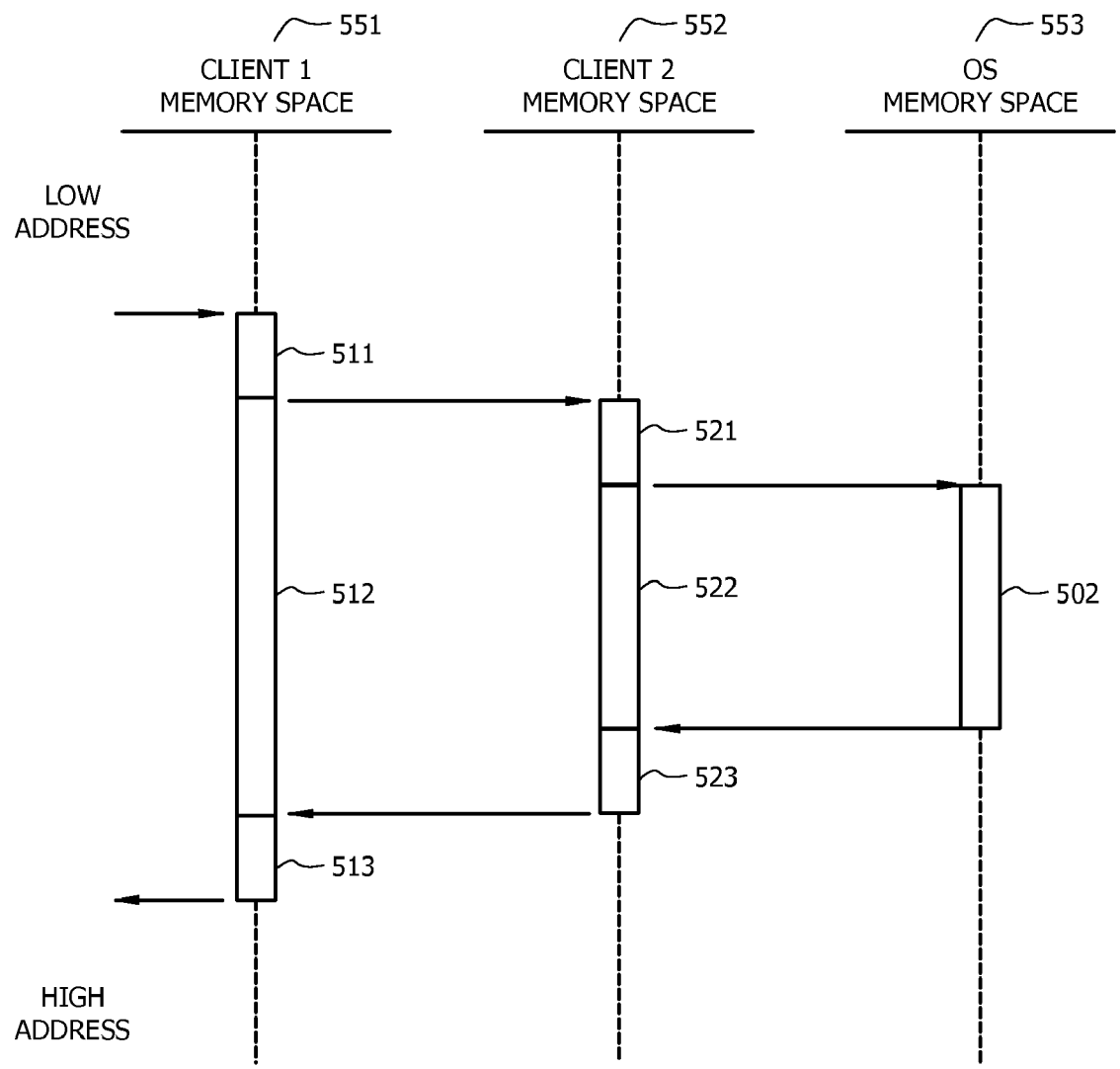
FIG. 5 provides a high-level process diagram of multiple clients attempting to intercept a kernel mode function.

FIG. 5 illustrates at an abstract level an example of the method of dispatching calls by stack-based control transfers between the code corresponding to an arbitrary kernel-mode interception 502 within OS memory space 553, and the registered hooking routines of a first registered client 551 and a second registered client 552. FIG. 5 displays how control is transferred from a client with higher priority (e.g., having a higher position on the Dispatcher's stack) to another client with lower priority, and from there to calling the original function (which always has lowest priority). Such control transfers—to invoke the original intercepted function—could happen multiple times at different places within the clients' body of execution code, and not necessarily only from a fixed location in the clients' body of execution code. One client does not know whether there is another client on the stack, so the client ordinarily assumes that it is calling the original intercepted function.

In the example of FIG. 5, first registered client 551 has higher priority than second registered client 552. Optional blocks 511, 513, 521, 523, which are illustrated by use of dotted boxes, may be requested by a client in the interception request, by instructing the UIM whether the client would like to receive pre-processing and/or post-processing (or neither) for the requested interception. The hooking routine of the first registered client 551 is stored in the memory space indicated by the concatenation of memory blocks 511, 512 and 513. The hooking routine of the second registered client 552 is stored in the memory space indicated by the concatenation of memory blocks 521, 522 and 523. This can be extended for additional registered clients.

Upon occurrence of an event to intercept, control first passes to the highest-priority client on the stack, here represented as client 1, reference item 551. Control passes to pre-processing part 511 and client 1 interception 512. Control then transfers to the next priority client on the stack, here represented as client 2, reference item 552, beginning with the optional pre-processing code 521 in the memory space of Client 2. This process will repeat for any additional clients on the stack, culminating with a call to the original intercepted kernel code 502. At the completion of the call to intercepted kernel code 502, control passes to post-processing code 523, 513, executed in reverse order of priority.

Figure 6:
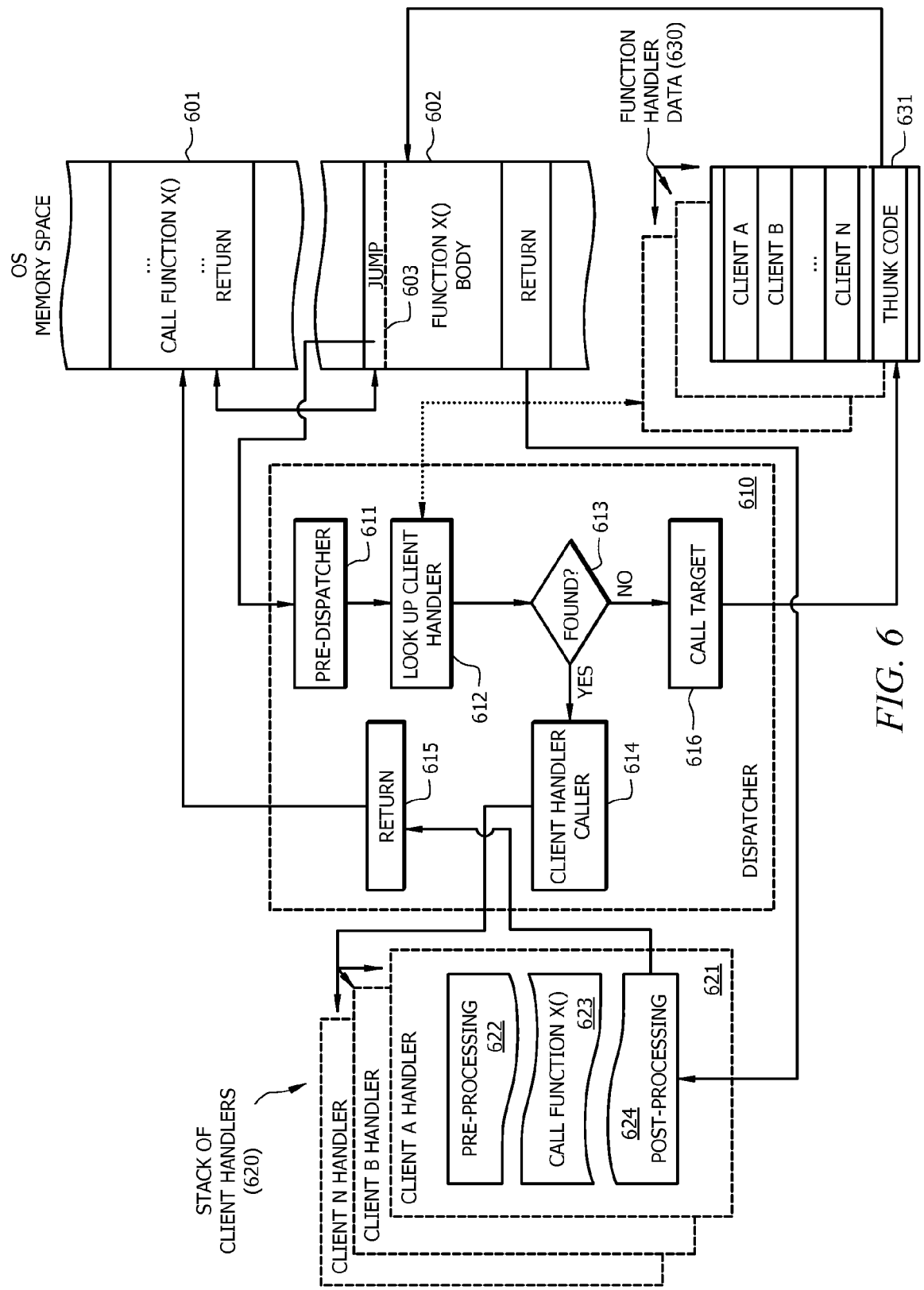
FIG. 6 provides a low-level process diagram of multiple clients attempting to intercept a kernel mode function.

FIG. 6 illustrates the process flow at a lower level of abstraction. A caller routine 601 located in the memory space of the OS calls a function 602, generically called Function X( ), which is the interception target. Exemplary patching of function 602 is illustrated in FIG. 7. Jump opcode 603 and Eyecatcher opcode 704 not shown in FIG. 6) are inserted into function 602 in order to transfer control to Dispatcher 610. The number of bytes and their layout in memory may differ from that shown in FIG. 7.

Referring again to FIG. 6, within Dispatcher 610, pre-Dispatcher 611 first performs validation to ensure that the Dispatcher was called by a valid interception that is registered with the Dispatcher. Validation may include, for instance, verification of a unique "Address" of the immediate origin of the call, followed by retrieval of the distinct Eyecatcher opcodes 704 within the code body of the immediate caller's code body. The pre-Dispatcher 611 may then compare both the Address and Eyecatcher 704 op-codes to an internal list of previously registered interceptions maintained by the Dispatcher. If the pre-Dispatcher 611 determines that interception is known to and registered with Dispatcher then pre-Dispatcher 611 passes control to the Lookup Client Handler 612. Pre-Dispatcher 611 differs from pre-processing parts 622, 511, 521, which allow parameters of the call to be analyzed and altered by hooking routines of the clients on the stack of client handlers 620.

Lookup Client Handler 612 examines its internal list of all registered clients and all respective hooking routines registered with clients, in order to determine whether any interception handlers are waiting to intercept calls to function 602. The Dispatcher potentially serves multiple hooking routines, so the Lookup Client Handler 612 also is responsible for indexing and searching through potentially multiple clients for the hooking routines that are associated with function 602. Lookup Client Handler 612 also interfaces with function handler data 630, which acts as storage for the contexts of calls to functions by the various clients. Function handler data 630 is illustrated having contexts for Function X( ) on top, with additional storage available for additional functions.

If decision block 613 finds client handlers are waiting to intercept Function X( ), then control passes to a client handler caller 614. Client handler caller 614 calls the top client handler in the stack 620 of client handlers. In the example of FIG. 6, the top client handler is Client A Handler 621. The Client A Handler 621 includes optional pre-processing 622, a call 623 to Function X( ), and optional post-processing 624. The functions performed by pre-processing 622 and post-processing 624 have been described earlier. Stack 620 may contain handlers for additional clients hooked to Function X( ). For instance, the exemplary stack 620 contains handlers for client B and client N which are lower priority in stack 620 than the priority for client A. The structure of handlers in stack 620 will be similar to the structure of Client A Handler 621, i.e., the handlers will ordinarily include an optional pre-processing step and an optional post-processing step.

Figure 8:
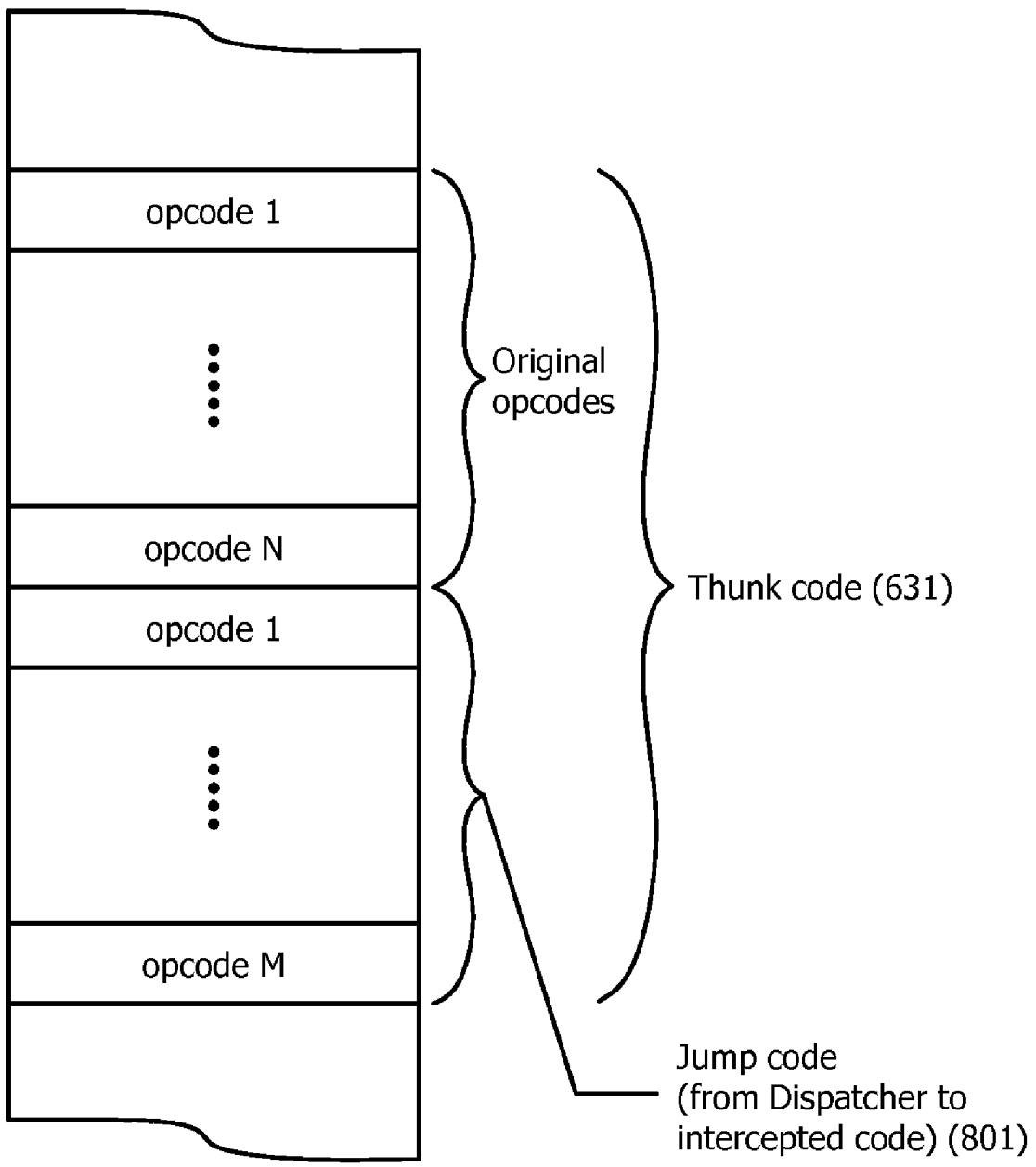
FIG. 8 illustrates an example of thunk code according to one or more embodiments of the invention.

If decision block 613 does not find that any client handlers are waiting to intercept Function X( ), then control passes to call target 616. Call target 616 executes thunk code 631, which is the interception target having original op-codes that were patched by the Dispatcher. FIG. 8 illustrates an example of thunk code 631 according to one or more embodiments of the invention. Thunk code 631 is executed first and then control is transferred to the original interception target Function X( ) by use of jump code 801. Restated, thunk code 631 executes op-codes 801 that transfer control to the remaining code (e.g. non-patched code) of the original interception target Function X( ), i.e., to a location in Function X( ) after the jump opcode 603. FIG. 8 illustrates the stricture of the thunk code 631. Control is then transferred to the last handling routine within stack 621 of client handlers. There can be multiple, concurrently executing handling routines associated with the same interception target. Multiple clients could have multiple handling routines that could be associated with the same interception target. Hierarchy imposed by the stack structure is important, because it resolves problem of transparency and allows for handling of the same interception by different clients (with different algorithms) concurrently while causing no inter-operability problems between them.

Once the Client A Handler 621 has finished its process, control passes to return step 615 of Dispatcher 610. Return step 615 performs any functions needed to exit the Dispatcher 610, and control is then transferred back to caller routine 601, at a memory location after the location of the original call to Function X( ).

At an application level, once the interprocess communication mechanism has been established between the software applications 313a, 313b (not shown in FIG. 4), 313c and the client manager 29, the software applications 313a, 313b (not shown in FIG. 4), 313c proceed to forward a suspension request (which is in the form of electronic data) to the client manager 29 via the interprocess communication mechanism. The suspension request identifies an event which the software application 313a, 313b (not shown in FIG. 4), 313c is interested in analyzing. The client manager 29 is arranged to store the suspension request in memory, or in an alternative embodiment, a shared database.

Subsequent to receiving the suspension request via the communication mechanism, the client manager 29 advises the provider manager 27 of the event that the suspension request identifies; that is, the event that the software application 313a, 313b (not shown in FIG. 4), 313c is interested in analyzing. In order to advise the provider manager 27 of the event, the client manager 29 invokes a method (software routine) of an application program interface of the provider manager 27.

Upon being advised of the event that the suspension request identifies, the provider manager 27 loads (activates) an appropriate one of the providers 25a, 25b (not shown in FIG. 4), 25c. The provider manager 27 loads the providers 25a, 25b (not shown in FIG. 4), 25c by invoking a method (software routine) of an application program interface associated with the providers 25a, 25b (not shown in FIG. 4), 25c. Each of the providers 25a, 25b (not shown in FIG. 4), 25c are designed to suspend a different class of events that can occur in the kernel-mode of the Windows NT operating system running on the first computer 111 (which is shown in FIG. 1). For example, one of the providers 25a, 25b (not shown in FIG. 4), 25c will be designed to suspend a class of events related to file input/output, whilst another of the providers 25a, 25b (not shown in FIG. 4), 25c will be designed to suspend a class of events related to network input/output. The provider manager 27 loads the provider 25a, 25b (not shown in FIG. 4), 25c that suspends the class of events to which the event (advised by the client manager 29) belongs. The provider manager 27 is also arranged to unload any of the providers 25a, 25b (not shown in FIG. 4), 25c that may have previously loaded.

Once the provider manager 27 has loaded the appropriate provider 25a, 25b (not shown in FIG. 4), 25c, the provider manager 27 instructs the provider 25a, 25b (not shown in FIG. 4), 25c that it requires a particular event to be suspended. To suspend the particular event, the provider 25a, 25b (not shown in FIG. 4), 25c interacts with the Windows NT operating system running on the computer 111 (see FIG. 1) to effect the installation of a kernel-mode handler in the execution path of the Windows NT operating system. In this regard, the providers 25a, 25b (not shown in FIG. 4), 25c are such that they interact with the Windows NT operating system via an application program interface of the operating system. Insertion of the kernel-mode handler will effect suspension of an event that is due to occur in the kernel-mode of the Windows NT operating system.

The handler inserted into the execution path of the Windows NT operating system is such that once it has suspend the relevant event (which is the event identified in the suspension request issued by the software application 313a, 313b (not shown in FIG. 4), 313c), it will notify the provider 25a, 25b (not shown in FIG. 4), 25c which effected the insertion of the kernel-mode handler. The Windows NT operating system notifies the appropriate providers 25a, 25b (not shown in FIG. 4), 25c about the suspension of an event via the application program interface of the operating system.

In response to being notified by the Windows NT operating system that an event in the kernel-mode has been suspended, the providers 25a, 25b (not shown in FIG. 4), 25c obtain information about the suspended event, (from the Windows NT operating system), and forward this information to the provider manager 27 which in turn forwards the information onto the client manager 29. On receiving the information from a provider 25a, 25b (not shown in FIG. 4), 25c, the provider manager 27 places the information into a queue so as to compliment the speed and asynchronous nature of the processing.

The provider manager 27 passes the information onto the client manager 29 by invoking an appropriate method (software routine) in an application program interface of the client manager 29. Using the interprocess communication mechanism connecting the client manager 29 and the software applications 313a, 313b (not shown in FIG. 4), 313c, the client manager 29 forwards the information onto the software application 313a, 313b (not shown in FIG. 4), 313c that requested the corresponding event to be suspended.

The information about the event provides sufficient information to enable to software applications 313a, 313b (not shown in FIG. 4), 313c to cause the event to occur in the user-mode of the Windows NT operating system, which the software applications 313a, 313b (not shown in FIG. 4), 313c do upon receiving the information via the interprocess communication mechanism. More specifically, the information about the event comprises mandatory standard parameters associated with the event. The information can also comprise optional auxiliary information. The information on the mandatory standard parameters include those that are commonly documented in operating system programming guides.

The software applications 313a, 313b (not shown in FIG. 4), 313c are arranged to operate in either a monitoring mode or a processing mode. In the monitoring mode the software applications 313a, 313b (not shown in FIG. 4), 313c monitor the event in the user-mode and collect information about the event. In the monitoring mode, the software applications 313a, 313b (not shown in FIG. 4), 313c do not influence the operation of the Windows NT operating system on the first computer 111. In the processing mode, the software applications 313a, 313b (not shown in FIG. 4), 313c influence the operation of the Windows NT operating system on the first computer 111 based on the occurrence of the event in the user-mode. The software applications 313a, 313b (not shown in FIG. 4), 313c will generally influence the operation of the Windows NT operating system if the occurrence of the event in the user-mode indicates that the event has the potential to compromise the first computer 111 if it occurs in the kernel-mode. The influence which the software applications 313a, 313b (not shown in FIG. 4), 313c have on the Windows NT operating system will depend on the nature of the occurrence of the event in the user-mode, and may for example including denying the ability to write data to a particular file. It is noted that in order to influence the operation of the Windows NT operating system, the software applications 313a, 313b (not shown in FIG. 4), 313c are arranged to issue instructions to the providers 25a, 25b (not shown in FIG. 4), 25c via the client manager 29 and the provider manager 27 in much the same way as the software applications 313a, 313b (not shown in FIG. 4), 313c issue suspension requests. The instructions issued by the software applications 313a, 313b (not shown in FIG. 4), 313c are such that upon processing by the providers 25a, 25b (not shown in FIG. 4), 25c, the providers 25a, 25b (not shown in FIG. 4), 25c interact with the Windows NT operating system to influence the operation of the operating system in accordance with the instructions.

As mentioned previously, the software applications 313a, 313b (not shown in FIG. 4), 313c and the kernel part 41 interact with each other, which involves the software applications 313a, 313b (not shown in FIG. 4), 313c issuing the suspension request and the client manager 29, which in turn sends the software applications 313a, 313b (not shown in FIG. 4), 313c information about suspended events. In this regard, the software applications 313a, 313b (not shown in FIG. 4), 313c and the client manager 29 employ a marshalling process and a de-marshalling process. In the case of the software applications 313a, 313b (not shown in FIG. 4), 313c the marshalling process involves formatting the suspension request according to a predefined format, and in the case of the client manager 29 the marshalling process involves formatting the information about the event according the predefined format. Formatting the suspension request and the information about the event is basically performed so that they can be transferred to each other over the interprocess communication mechanism. The de-marshalling process is simply the reverse of marshalling; that is, it involves the software applications 313a, 313b (not shown in FIG. 4), 313c extracting the information about the event from the predefined format, and the client manager 29 extracting the suspension request from the predefined format.

The predefined format used by the software applications 313a, 313b (not shown in FIG. 4), 313c and the client manager 29 is the common information model defined by the distributed management task force (CIM DMTF). Persons skilled in the art will readily appreciate the details of the CIM DMTF. However, those not skilled in the art are referred to the DMTF Internet site, which is located at www.dmtf.org.

In addition to the previously described functions performed by the provider manager 27, client manager 29, and the software applications 313a, 313b (not shown in FIG. 4), 313c, these components of an embodiment of the present invention provide various other functions. In the case of the client manager 29, it has the ability to provide the software applications 313a, 313b (not shown in FIG. 4), 313c with details of the providers 25a, 25b (not shown in FIG. 4), 25c that are currently 313a, 313b (not shown in FIG. 4), 313c loaded, and which can be loaded. Effectively, this allows the software applications 313a, 313b (not shown in FIG. 4), 313c to determine the events (and classes thereof) that can be suspended. In order to be able to provide the software applications 313a, 313b (not shown in FIG. 4), 313c with the details of the providers 25a, 25b (not shown in FIG. 4), 25c, the client manager 29 queries the provider manager 27 via the application program interface thereof. In regard to the provider manager 27, it provides a CIM DMTF library and repository. The software applications 313a, 313b (not shown in FIG. 4), 313c are such that they can interact with each other so as to effect the other applications 313a, 313b (not shown in FIG. 4), 313c ability to process the information about the event, which is forwarded thereto by the client manager 29.

Figure 9:
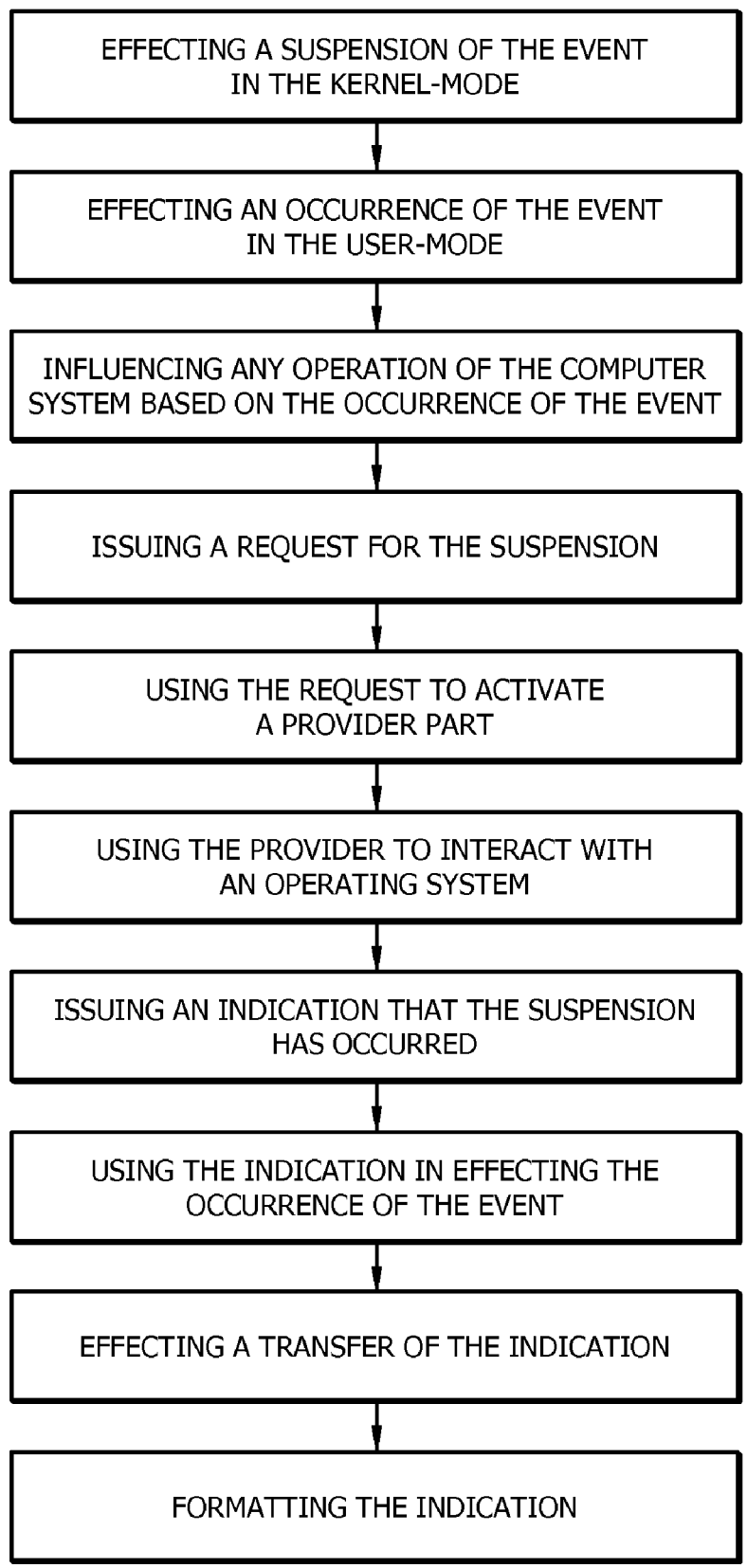
FIG. 9 is a flow chart of the various steps performed by an embodiment of the present invention.

The various steps performed by an embodiment of the present invention are shown in the flow chart of FIG. 9 at a high level of abstraction.

It will be appreciated that while the previous description of an embodiment of the present invention refers to the Windows NT operating system, one or more embodiments will have application to other operating systems that have a kernel-mode and a user-mode, or similar concept. Examples of another operating systems are UNIX based operating systems. Persons skilled in the art will also appreciate that whilst the embodiment has been described in the context of software being executed under the NT operating system, it is possible that one or more embodiments (or parts thereof) could be performed by dedicated hardware.

Those skilled in the art will appreciate that the invention described herein is susceptible to variations and modifications other than those specifically described. It should be understood that the invention includes all such variations and modifications which fall within the spirit and scope of the invention.

The invention claimed is:

1. A system for handling an event in a computer system which has a kernel-mode and a user-mode, the system comprising:
at least one computing device configured to:
(a) suspend an occurrence of the event in the kernel-mode of an operating system running on said computing device;
(b) cause the event to occur in the user-mode for one or more clients of the operating system; and
(c) prioritize occurrence of the event among the one or more clients by use of a stack-based dispatcher.

2. The system as claimed in claim 1, wherein the one or more clients are configured to influence an operation of the computer system based on the occurrence of the event in the user-mode.

3. The system as claimed in claim 2, wherein the one or more clients are configured to influence an operation of the computer system by preventing the event from occurring in the kernel-mode.

4. The system as claimed in claim 1, wherein the computing device is further configured to:
run a user-mode software application operative to issue a request for the suspension of the occurrence of the event in the kernel-mode; and
run a first kernel-mode software module operable to use the request in order to activate a second kernel-mode software module operable to effect suspension of a class of events that comprises the event.

5. The system as claimed in claim 4, wherein the second kernel-mode software module is further operable to interact with the operating system of the computer system in order to effect the suspension.

6. The system as claimed in claim 4, wherein the first kernel-mode software module is further operable to issue an indication that the suspension has been effected, and the user-mode software application is further operable to use the indication in effecting the occurrence of the event in the user-mode.

7. The system as claimed in claim 6, wherein the first kernel-mode software module is further operable to use an interprocess communication mechanism to transfer the indication to the user-mode software application, the user-mode software application being operable to use the interprocess communication mechanism to transfer the request to the first kernel-mode software module.

8. The system as claimed in claim 7, wherein the interprocess communication mechanism uses an Internet protocol.

9. The system as claimed in claim 6, wherein the first kernel-mode software module and the user-mode software application are operable to respectively format the indication and the request according to a predefined format.

10. The system as claimed in claim 9, wherein the predefined format accords with a common information model defined by a distributed management task force.

11. The system as claimed claim 10, wherein the first kernel-mode software module operates in the kernel mode, and the user-mode software application operates in the user-mode.

12. The system as claimed claim 11, wherein the user-mode software application comprises an anti-virus scan engine.

13. A method of handling an event in a computer system which has a kernel-mode and a user-mode, the method comprising the following steps performed by at least one computing device:
suspending an occurrence of the event in the kernel-mode of an operating system running on said computing device;
causing the event to occur in the user-mode for one or more clients of the operating system; and
prioritizing occurrence of the event among the one or more clients by use of a stack- based dispatcher.

14. The method as claimed in claim 13, wherein the method further comprises-the step of influencing an operation of the computer system based on the occurrence of the event in the user-mode.

15. The method as claimed in claim 14, wherein the step of influencing the operation of the computer system comprises preventing the event from occurring in the kernel-mode.

16. The method as claimed in claim 15, further comprising the steps of:
   issuing a request for the suspension of the occurrence of the event in the kernel-mode; and
   using the request in order to activate a kernel-mode software module that is operable to effect suspension of a class of events that comprises the event.

17. The method as claimed in claim 16, further comprising the step of using the kernel-mode software module to interact with the operating system of the computer system in order to effect the suspension.

18. The method as claimed in claim 16, further comprising the steps of:
   issuing an indication that the suspension has been effected; and
   using the indication in effecting the occurrence of the event in the user-mode.

19. The method as claimed in claim 18, further comprising the step of effecting a transfer of the indication to a user-mode software application for use thereby.

20. The method as claimed in claim 19, wherein the step of effecting the transfer of the indication comprises using an interprocess communication mechanism.

21. The method as claimed in claim 20, wherein the interprocess communication mechanism uses an Internet protocol.

22. The method as claimed in claim 18, further comprising the step of formatting the indication and the request according to a predefined format.

23. The method as claimed in claim 22, wherein the predefined format accords with a common information model defined by a distributed management task force.

24. The system as claimed in claim 1, wherein the event is selected from the group comprising a file system input/output based event, a network input/output based event, a memory management input/output based event, and a process management based event.

25. The system as claimed in claim 1, wherein the computing device is further configured to deny an ability to write data to or read data from a file stored in a memory device of the computer system.

* * * * *